United States Patent [19]

Saliger

[11] Patent Number: 4,602,806
[45] Date of Patent: Jul. 29, 1986

[54] SEAL CONSTRUCTION FOR FLUID SWIVEL JOINTS INCORPORATING A FREE-FLOATING ANTI-EXTRUSION DEVICE WITH OIL INJECTION SYSTEM

[75] Inventor: Kenneth C. Saliger, DeSoto, Tex.

[73] Assignee: Mobil Oil Corporation, New York, N.Y.

[21] Appl. No.: 574,316

[22] Filed: Jan. 27, 1984

[51] Int. Cl.$^4$ ............................................. F16L 53/00
[52] U.S. Cl. ........................................ 285/41; 285/98; 285/108; 285/136; 285/351; 277/22; 277/24; 277/27
[58] Field of Search ............... 285/41, 98, 94, 281, 285/108, 136, 351; 277/3, 22, 24, 27, 83, 173, 205

[56] References Cited

U.S. PATENT DOCUMENTS

| | | | |
|---|---|---|---|
| 3,049,877 | 8/1962 | Sherman | 285/41 X |
| 3,411,811 | 11/1968 | Holland | 285/281 X |
| 3,429,588 | 2/1969 | Nelson | 285/261 X |
| 4,154,446 | 5/1979 | Usry | 285/41 X |
| 4,234,215 | 11/1980 | Wilson | 285/41 |
| 4,405,162 | 9/1983 | Williams | 285/136 |
| 4,477,085 | 10/1984 | Bridger et al. | 277/22 |

FOREIGN PATENT DOCUMENTS 0013455 12/1979 European Pat. Off. .
2132726 12/1983 United Kingdom .

Primary Examiner—Dave W. Arola
Attorney, Agent, or Firm—Alexander J. McKillop; Michael G. Gilman; Charles J. Speciale

[57] ABSTRACT

A seal arrangement for a fluid swivel joint such as is commonly used on offshore loading terminals for tankers. The sealed fluid joint includes first and second adjacent joint rings which are rotatable relative to each other about a common central longitudinal axis. The joint rings have a small annular, ring-shaped clearance gap therebetween to allow relative rotational movement, and one of the rings includes an annular seal housing groove facing the clearance gap. An annular seal is positioned in the seal housing groove, and its componets include a pliant annular, sealing member and an adjacent free-floating anti-extrusion ring to prevent the pliant sealing member from being deformed into the clearance gap by a relatively high fluid pressure differential existing across the seal. An oil injection system circulates a flow of oil between a sealing face on one of the joint rings and the contacting surfaces of the sealing member and anti-extrusion so as to remove generated heat and any seal wear debris from the seal arrangement.

10 Claims, 2 Drawing Figures

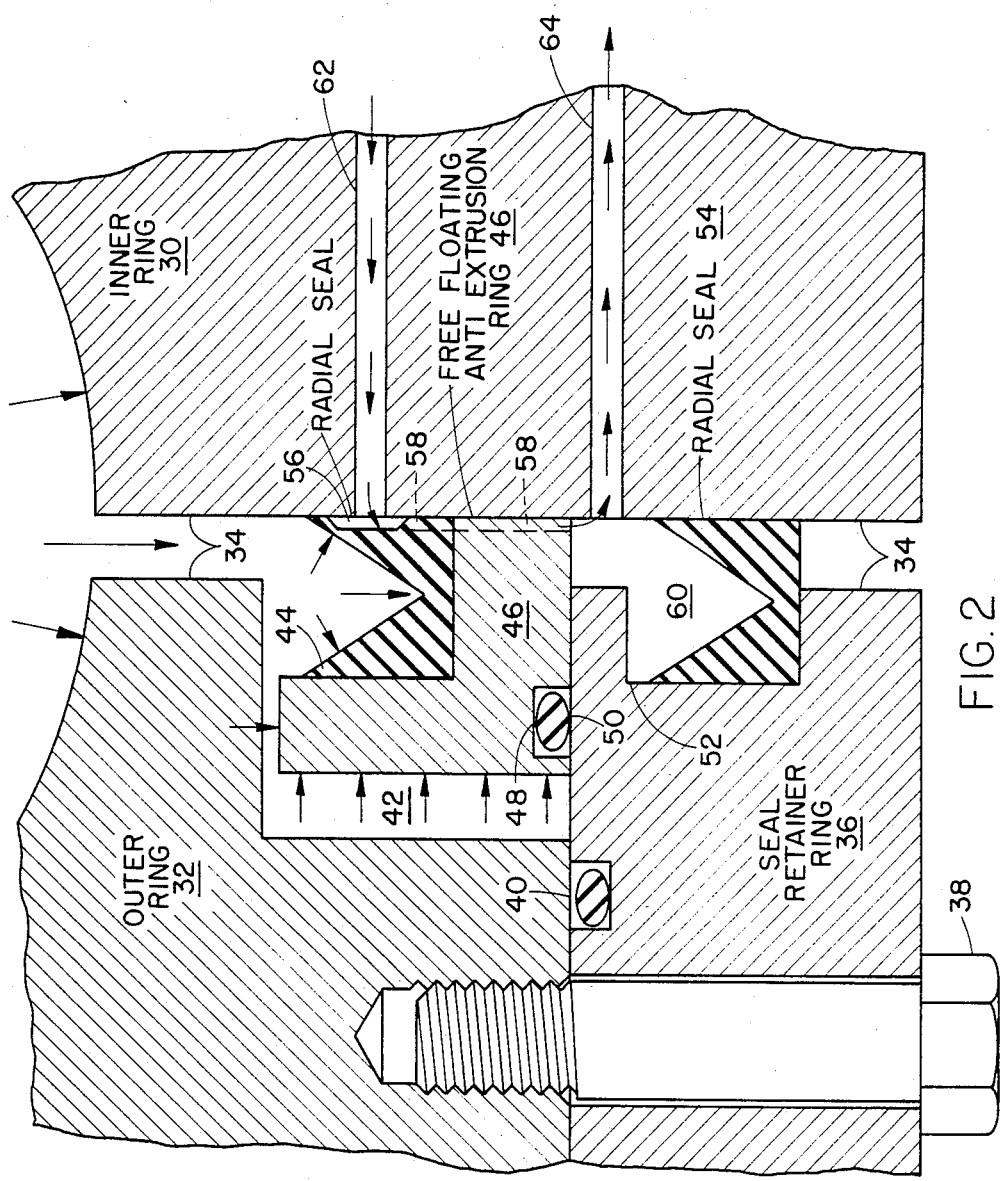

SEAL CONSTRUCTION FOR FLUID SWIVEL JOINTS INCORPORATING A FREE-FLOATING ANTI-EXTRUSION DEVICE WITH OIL INJECTION SYSTEM

BACKGROUND OF THE INVENTION

1. Field of the Invention

The present invention relates generally to a seal construction for a fluid swivel joint, and more particularly, pertains to a seal construction for a large diameter, high pressure fluid and gas swivel joint, such as is commonly used on offshore loading terminals for oil and gas tankers.

2. Description of the Prior Art

The development of subsea petroleum and gas production systems has included a concept wherein a floating processing and storage vessel incorporates as a significant component thereof a high pressure multiple passage fluid swivel joint. the fluid swivel joint essentially includes therein a plurality of stationary fluid passages or pipes extending downwardly from the interior of the fluid swivel joint to carry gas, oil, air, water, or other fluids either up thereto or down therefrom. A plurality of couplings are mounted on the exterior of the fluid swivel joint and are rotatable relative thereto, with each rotatable coupling communicating through the fluid swivel joint with one of the stationary fluid passages or pipes. Griebe U.S. Pat. No. 2,894,268 and Briatianu U.S. Pat. No. 3,590,407 disclose float supported sea terminals utilizing a concept very similar to that described above.

A problem associated with such a fluid swivel joint is in the provision of seals which will withstand the relatively high pressure differentials, often up to 6000 psi thereacross, while also providing for the relative rotational movements associated with the swivel joints. The seals which have been utilized in many of these fluid swivel joints have been V-type lip seals, which often resulted in very large frictional forces in the swivel joints when they are designed to accommodate the high pressure differentials.

Additionally, the high pressure differentials have also resulted in extrusion of the relatively pliant sealing members into the gaps which they are designed to seal. Prior art swivel joints have often been constructed with an outer ring which rotates about an inner ring with radial seals therebetween. High internal pressures often result in deflections in the rings which increase the radial clearance gap. Common seal materials cannot effectively bridge this gap while maintaining the pressure integrity of the seal. Therefore, common seal materials have been reinforced with various elements to increase the materials' physical strength in order to bridge the radial clearance gaps. Unfortunately, the reinforcing elements tend to render the seal material compounds less resilient and more abrasive. Consequently, a seal formed of these compounds must have a high contact force in order to effect a seal because the less resilient materials have increased resistance to the filling into microgrooves in the mating seal surface so as to seal against any fluid passage. The higher contact stress and the more abrasive nature of the reinforcing elements of the material compounds tend to increase wear of both the seal and the seal mating surface, frequently leading to loss of pressure integrity of the seal. In order to solve the problems of extrusion of the seal materials into the gap, the prior art has also utilized anti-extrusion rings of hard plastic or metal to support sealing elements and bridge the clearance gap between the rings of a fluid swivel joint. Unfortunately, these prior art designs have not proven to be totally satisfactory.

In order to ameliorate the problems encountered in prior art seal constructions of this type, U.S. patent application Ser. No. 454,826; filed on Dec. 30, 1982; and assigned to the common assignee of this application, and now U.S. Pat. No. 4,555,118, discloses improved sealing arrangements for a fluid swivel joint such as is commonly used in offshore loading terminals for tankers. Among various disclosed embodiments is a sealing arrangement which is designed with a bias-loaded anti-extrusion ring or seal to minimize the seal extrusion gap therein.

Also disclosed is a sealing arrangement for a fluid swivel joint wherein the components of the seal are relatively free-floating in order to compensate for eccentricity or other variations or distortions in the components of the fluid swivel joint.

Pursuant to the copending U.S. patent application Ser. No. 454,826 a sealed fluid joint has first and second adjacent joint rings which are rotatable relative to each other about a common central longitudinal axis. The joint rings have a small annular, ring-shaped clearance gap provided therebetween so as to allow for relative rotational movement, and one of the rings defines an annular seal housing groove adjacent to the clearance gap. An annular seal is positioned in the seal housing groove, and its components include an annular sealing member and an adjoining anti-extrusion ring to prevent the pliant sealing member from being extruded into the clearance gap by the relatively high fluid pressure differential existing across the seal. The anti-extrusion ring or the sealing member is biased against an adjacent sealing surface to provide an effective high pressure fluid seal therebetween and also to minimize the extrusion gap existing within the seal. In several embodiments, the swivel joint defines a radial seal configuration having a cylindrically shaped clearance gap extending symmetrically around the central longitudinal axis. In other alternative constructions, the swivel joint defines a face seal configuration having a radially flat-shaped clearance gap positioned symmetrically around the central longitudinal axis.

Moreover, the biasing action is achieved by a spring which is positioned in the seal housing groove so as to bias the annular sealing member against a sealing surface on the second joint ring. In one embodiment, a coil spring is mounted in compression, extending between a wall of the seal housing groove and the annular seal. In another embodiment, a spring extends circumferentially around the annular seal in the annular seal housing groove. In several other embodiments, the spring biases the anti-extrusion ring against the annular sealing member to cause it to bear against a sealing surface on the second joint ring and to also minimize the seal extrusion gap within the seal.

In various of the seal designs, the seal utilizes the pressure differential existing across the seal to pressure bias the annular sealing member against a sealing surface and also to minimize the seal extrusion gap. Other designs allow for the pressure differential to bias the anti-extrusion ring against the annular sealing member to cause it to bear against a sealing surface on the second joint ring and also to minimize the anti-extrusion gap. In one disclosed embodiment, the pressure differential is utilized to directly bias the annular sealing member against a sealing surface.

In several of the seal designs, the annular sealing member is formed with a V-shaped concave slot therein extending along its annular length to take further advantage of the pressure differential, while in other seal designs, the anti-extrusion ring is constructed with an L-shaped cross-section, and the annular sealing member is positioned between the two legs of the L. In one design, the V-shaped concave slot has its V-shaped opening facing in the direction of the annular clearance gap, while in another the V-shaped opening faces orthogonally away from the annular clearance gap.

Moreover, several multi-element seals are disclosed in embodiments designed to eliminate problems associated with prior art seals of this kind, such as extrusion of the sealing element and unnecessary wear of both the seal mating surfaces. Several of these seal designs include a secondary sealing member positioned intermediate the pliant sealing member and the anti-extrusion ring. In these embodiments, O-rings are positioned between the pliant sealing member and the secondary sealing member and also between the secondary sealing member and the anti-extrusion ring.

The anti-extrusion rings may be constructed of separate pieces or, alternatively, may be an integral component of the seal.

As long as the inner and outer rings of the swivel joint are in a concentric condition relative to each other, the anti-extrusion rings or devices will perform their sealing function in a satisfactory manner. However, operating conditions are encountered at times wherein the inner and outer rings of the swivel joint become eccentric relative to each other, so as to cause any anti-extrusion ring which is composed of plastic material to be either fractured or deformed to the point of becoming ineffective. Under similar conditions, when the anti-extrusion rings are constructed of metal, they can readily damage the seal surfaces of the inner and outer swivel joint rings as a consequence of their relative eccentricity. Moreover, the eccentricity which may be encountered between the inner and outer rings will cause the non-uniform radial loading of the seal so as to adversely affect the seal pressure integrity, and to produce uneven seal wear tending to result in premature seal failure.

SUMMARY OF THE INVENTION

In order to alleviate any problems which may be encountered as the result of eccentricity between the inner and outer rings of the swivel joint, and due to an excessive seal gap caused by high pressures, the inventive free-floating anti-extrusion device incorporates a novel and unique oil injection system which operates at a generally low pressure.

One of the primary purposes of the oil injection system resides in cooling the seal and in the removal of debris resulting from seal wear from the seal lip area. Moreover, the injected oil lubricates the interfaces between the seal, anti-extrusion ring and the inner ring of the swivel joint. This will effectively reduce heat buildup and wear of these components and, as a consequence thereof, significantly extend the swivel life of the entire swivel joint installation.

Accordingly, it is an object of the present invention to provide an improved sealing arrangement for a high-pressure fluid and gas swivel joint as commonly used in offshore loading terminals for tankers.

Another object of the invention resides in the provision of a sealing arrangement of the type described which includes an anti-extrusion rings to minimize the seal extrusion gap, wherein the seal components are relatively free-floating to compensate for eccentricities in the components of the fluid swivel joint, and incorporating a low-pressure oil injection system for cooling the seal, remove seal debris tending to produce wear, and to impart a degree of lubricity to interfacing seal components.

BRIEF DESCRIPTION OF THE DRAWINGS

The foregoing objects and advantages of the present invention for an improved seal construction for fluid swivel joints incorporating an oil injection system may be more readily understood by one skilled in the art with reference being had to the following detailed description of several preferred embodiments thereof, taken in conjunction with the accompanying drawings wherein like elements are designated by identical reference numerals throughout the several views, and in which:

FIG. 2 illustrates a sectional view on an enlarged scale through an embodiment of a radial type of fluid joint seal incorporating an oil injection system according to the present invention.

DETAILED DESCRIPTION OF THE DRAWINGS

Figure 1:
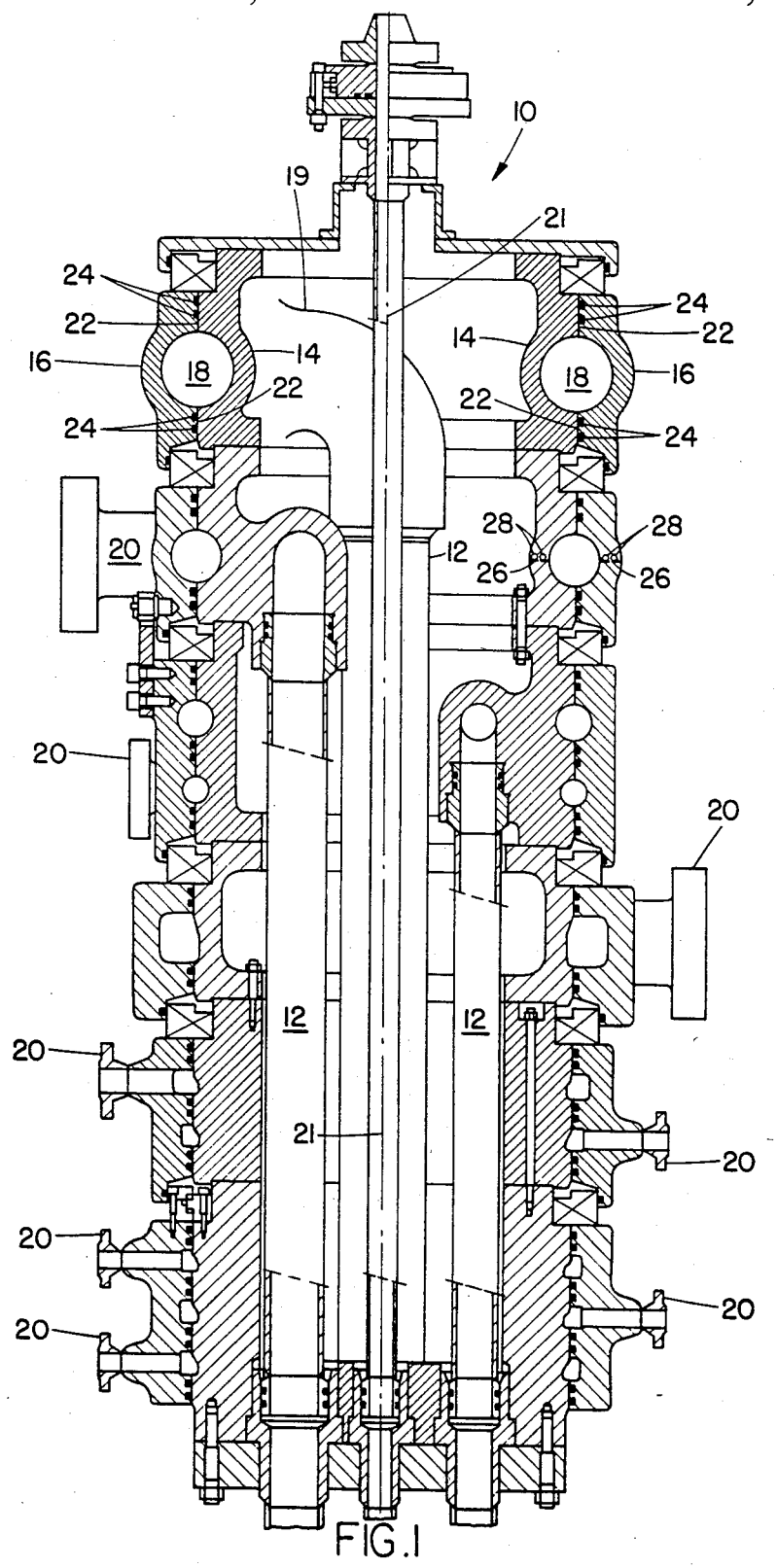
FIG. 1 illustrates an elevational, sectional view of a known type of fluid swivel joint having a radial type of seal configuration therein.

Referring to the drawings in detail, FIG. 1 is an elevational sectional view of a fluid swivel joint 10 for an offshore loading terminal for tankers, having radial fluid seals therein. A plurality of nonrotatable fluid passages or pipes 12, of various diameters, extend vertically within the swivel joint to one of ten different levels therein. Typically, these passages or pipes carrying gas, oil, air, water, or other fluids either up to or down from the swivel joint 10, at pressures ranging up to 6000 psi. Other arrangements might include either more or less fluid passages and levels in alternative configurations of fluid swivel joints, the outermost diameter of which is often to the order of six feet. The uppermost level of the fluid swivel joint is exemplary of the other levels, and includes a relatively stationary, inner joint ring 14 and a rotatable outer joint ring 16. The inner and outer joint rings 14 and 16 define therebetween an annular fluid manifold 18. One of the fluid passages 12 is joined by a coupling 19 through the inner wall of ring 14 to the annular fluid manifold 18, and likewise a coupling 20 (shown for some of the lower levels of the fluid swivel joint) leads from the outer wall of outer joint ring 16. The arrangement is such that a fluid passageway is established from coupling 20, through the fluid manifold 18, to one of the vertical fluid passages 12, while also allowing rotation of coupling 20 and outer joint ring 16 relative to the stationary, inner joint ring 14 and fluid passage or pipe 12. The inner and outer joint rings 14 and 16 have a common concentric longitudinal axis 21, and rotation of the outer ring 16 also takes place about this common axis.

The inner and outer joint rings 14 and 16 define upper and lower small annular clearance gaps 22 therebetween to allow for the relative rotational movements.

FIG. 1 illustrates a radial type of swivel joint seal in which the clearance gap 22 forms a generally cylindrical shape. A plurality of annular seals 24 are provided in the clearance gaps 22 to seal the fluid manifold, while also providing for the relative rotational movements, and the present invention is particularly concerned with the construction of these annular seals.

Fluid swivel joints known in the art may also utilize a second type of fluid swivel joint having a face type of seal configuration, the construction of which is shown generally in dashed lines on the right side of the second highest level of the fluid swivel joint illustrated in FIG. 1. In this type of seal, each fluid manifold is defined by an upper joint ring and a lower joint ring, and the clearance gap 26 therebetween is a radially flat-shaped gap extending symmetrically around the common central longitudinal axis 21. In a fluid swivel joint having a face type of seal, the upper and lower joint rings are commonly constructed as separate integral parts which are rotatable relative to each other. A plurality of annular seals 28 are provided in the radially flat gap 26, and these seals function similar to the annular seals 24 previously described.

FIG. 2 illustrates the details of a fluid swivel joint having a radial seal therein which includes free-floating components and the inventive oil injection system to compensate for problems of eccentricity which might be encountered with a radial type of seal. Known prior art seals generally performed satisfactorily in fluid swivel joints with radial seals as long as the inner and outer joint rings remained concentric. However, any eccentricity of the inner and outer joint rings with respect to each other often resulted in plastic anti-extrusion rings being fractured or deformed to the point of being ineffective. Metal anti-extrusion rings, on the other hand, could readily damage the sealing surfaces of the inner and outer rings if the rings became eccentric. Moreover, eccentricity often resulted in nonuniform radial loading of the seal, which could adversely affect the integrity of the seal or cause uneven seal wearing, thus resulting in premature seal failure. The embodiment described herein is designed to compensate for eccentricity in the inner and outer joint rings and to prevent undesired extrusion of the seal into the clearance gap.

With reference to FIG. 2 of the drawings, the swivel joint of the present invention includes an inner joint ring 30 and an outer joint ring 32, with a radial clearance gap 34 being defined therebetween. A seal retainer ring 36 is secured in place by a plurality of bolts 38, and an O-ring seal 40 seals the two components relative to each other. The seal retainer ring 36 and outer ring 33 together define an annular seal housing groove 42 adjacent to the clearance gap 34. An annular seal is constructed with a first annular, pliant sealing member 44 and an L-shaped anti-extrusion ring 46. The lower surface of the anti-extrusion ring 46 defines an annular groove 48 for housing an O-ring 50, to provide a seal between the anti-extrusion ring 46 and the seal retainer ring 36. The free-floating anti-extrusion ring 46 is initially displaced from the inner joint ring 30 by a relatively small seal extrusion gap.

In operation, the internal pressure is transmitted through clearance cap 34, and above radial seal 44 and anti-extrusion ring 46 to the outer side of the anti-extrusion ring, such that the pressure differential across the seal presses the anti-extrusion ring against the outer diameter of the seal member 44, and against the outer surface of inner ring 30. Moreover, a clearance is provided between the outer diameter of the anti-extrusion ring 46 and and the inner diameter of the seal housing groove 42 which allows for limited eccentric horizontal movements of the outer ring 32 relative to the inner ring 30 without adversely affecting either the radial loading of the sealing element 44.

The internal pressure acting on the outside diameter of the anti-extrusion ring 46 deflects the latter inwardly towards the inner joint ring 30, and thereby reduces the seal extrusion gap. As a result, an increasing internal pressure will reduce the seal extrusion gap to thereby alleviate any problem of seal extrusion.

The inventive oil injection system, which operates under a low pressure, is employed to cool the seal and remove seal wear debris from the seal lip area, and operates as follows:

Oil is injected into the seal structure through the inlet passageway 62 in the inner joint ring 30, flows into and circulates within annular groove 56 in the sealing member 44, flows downwardly through recesses or grooves 58, and enter annular space 60 after the formation of an oil film on the interfaces between the anti-extrusion ring 46 and inner joint ring 30. The sealing member 54 prevents leakage of the oil to atmosphere, and forces circulation of the circulated oil through the oil outlet passageway 64. The heat which is generated by the friction of the sealing member 44 and anti-extrusion ring 46 against the surface of the inner joint ring 30 is transmitted to the injected circulating oil. After leaving the outlet passageway 64, the oil may be filtered and cooled prior to being recirculated through the seal arrangement by means of a suitable circulating pump (not shown).

Although the concept of injecting oil into a seal system is known in the technology, such as for controlled leakage shaft seals for turbine gas compressors, the formed oil film affects or produces the seal. Contrastingly, the oil injection system of the present invention primarily serves the purpose of removing heat and seal wear debris and also provides some minor degree of lubricity to interfacing components.

While a preferred embodiment of the present invention for seal constructions for fluid swivel joints is described in detail herein, it should be apparent that the disclosure and teachings of the present invention will suggest many alternative designs to those skilled in the art.

What is claimed is:

1. A sealed fluid swivel joint, comprising:
   a. a first and second adjacent joint rings, means for supporting said joint rings for rotation relative to each other about a common central longitudinal axis and defining a small annular, ring-shaped clearance gap therebetween to allow said relative rotational movement between the first and second joint rings, and an annular seal housing groove being formed in said first joint ring facing said clearance gap;
   b. an annular seal positioned in said annular seal housing groove providing a seal between said first joint ring and said second joint ring, said annular seal including an annular, pliant sealing member, and a rigid annular anti-extrusion ring to prevent the pliant sealing member from being deformed into said clearance gap by a fluid pressure differential existing across said annular seal, and retainer means fastened to said first joint ring for maintaining said anti-extrusion ring in said annular seal housing groove, said fluid pressure differential biasing said annular sealing member against an adjacent sealing face on said second joint ring to provide an effective fluid seal therebetween;

c. and oil injection means providing a circulating flow of oil intermediate said annular sealing member and the adjacent sealing face on said second joint ring so as to remove generated heat and seal wear debris from the interface between said sealing member and the second joint ring.

2. A sealed fluid swivel joint as claimed in claim 1, said swivel joint defining a radial joint as claimed in claim 1, said swivel joint defining a radial seal configuration in which said ring-shaped clearance gap defines a cylindrically-shaped clearance gap extending symmetrically about said common central longitudinal axis.

3. A sealed fluid swivel joint as claimed in claim 1, wherein said pressure differential existing across said annular seal to pressure biases said anti-extrusion ring against said annular sealing member to cause the latter to bear against the sealing face on said second joint ring.

4. A sealed fluid swivel joint as claimed in claim 1, said annular sealing member including a V-shaped, concave slot therein extending along its annular length.

5. A sealed fluid swivel joint as claimed in claim 4, wherein said V-shaped concave slot has its concave opening facing in the direction of said annular clearance gap.

6. A sealed fluid swivel joint as claimed in claim 1, wherein anti-extrusion ring has an L-shaped cross-section with the two legs of said L-shape being disposed substantially orthogonally relative to each other, said annular sealing member being positioned between the legs of said anti-extrusion ring.

7. A sealed fluid swivel joint as claimed in claim 1, comprising an annular groove means formed in the surface of said annular sealing member contacting the adjacent sealing surface on said second joint ring; circumferentially spaced recesses formed in said annular sealing member and communicating with said annular groove; circumferentially spaced recess formed in said anti-extrusion ring in alignment with said communicating with the recesses in said annular sealing member; oil inlet passageway means in said second joint ring connecting with said annular groove, and oil outlet passageway means in said second joint ring communicating with said recesses spaced from said annular groove to facilitate circulating flow of oil through said passageway means, said annular groove and said recesses.

8. A sealed fluid swivel joint as claimed in claim 7, said oil being circulated at a relatively low pressure.

9. A sealed fluid swivel joint as claimed in claim 7, comprising a second annular sealing member intermediate said retainer means and said second joint rings proximate the discharge ends of said oil-circulating recesses in said anti-extrusion ring so as to prevent leakage of said oil to atmosphere.

10. A sealed fluid swivel joint as claimed in claim 9, said second sealing member being supported in an annular groove formed in said retainer means, and having one surface sealingly contacting the adjacent sealing face on said second joint ring.

* * * * *